(No Model.)
E. L. PERRY.
MANUFACTURING HOLLOW RUBBER ARTICLES.
No. 472,225. Patented Apr. 5, 1892.
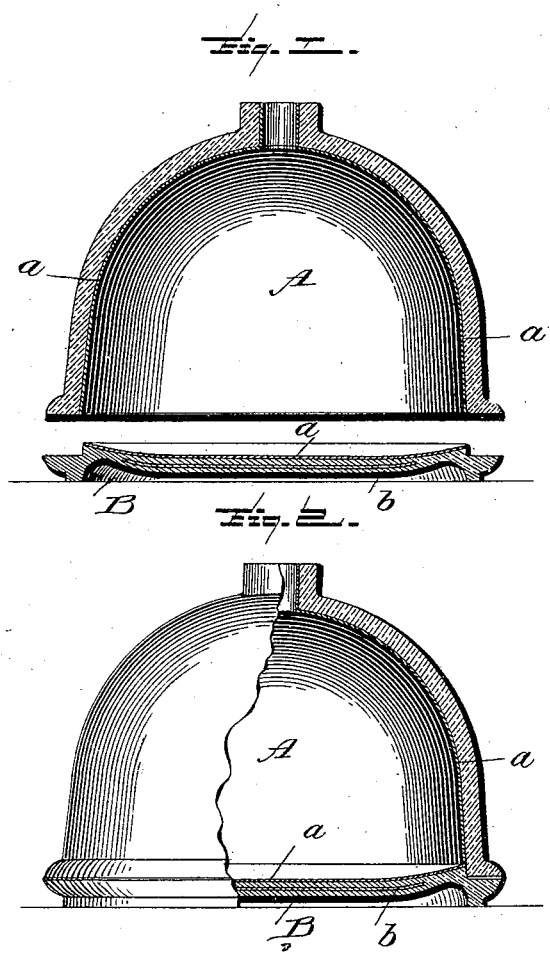

UNITED STATES PATENT OFFICE.

EDWARD L. PERRY, OF PATERSON, NEW JERSEY.

MANUFACTURING HOLLOW RUBBER ARTICLES.

SPECIFICATION forming part of Letters Patent No. 472,225, dated April 5, 1892.

Application filed April 22, 1891. Serial No. 389,895. (No model.)

*To all whom it may concern:*

Be it known that I, EDWARD L. PERRY, a citizen of the United States, residing at Paterson, in the county of Passaic and State of New Jersey, have invented certain new and useful Improvements in Manufacturing Hollow Rubber Articles; and I do hereby declare that the following is a full, clear, and exact description of the same, reference being had to the annexed drawings, making a part of this specification, and to the letters of reference marked thereon.

Figure 1 of the drawings represents a sectional view of a hollow rubber article, such as an oil-can, showing the bottom and body thereof separated; Fig. 2, a side elevation, partly in broken section, showing the bottom connected to the body.

The present invention has relation to the method of manufacturing hollow rubber articles—such as oil-cans and the like—wherein it is necessary to provide the interior with an oil or acid proof coating in order to render such article capable of holding oils, acids, alkalies, and other chemical liquids; and the invention consists in the method of manufacture, as will be hereinafter described and claimed.

In the accompanying drawings I have shown a rubber oil-can as one of many hollow articles to which my invention is applicable, the spout thereof not being shown, the can, as shown, consisting of two parts—viz., the body A and bottom B, of rubber. These two parts A B are formed separately in suitable molds, after which a coating of shellac or other oil and acid proof substance is applied to the interior of the body and the upper side of the bottom, as indicated at $a$. After the coating is thoroughly dried the two sections constituting, in the present instance, the body and bottom of an oil-can are united or firmly connected by pressure or in any other preferred manner.

When my invention is applied to oil-cans, it may be found advisable to use an interposed layer of duck or other suitable material, as shown at $b$, for the purpose of strengthening it at this point and preventing it from wearing through by continued pressure thereon, this feature materially enhancing the value of such an article with respect to its durability and wear.

Having now fully described my invention, what I claim as new, and desire to secure by Letters Patent, is—

1. An oil-can consisting of a rubber body provided with an oil and acid proof coating and a separately-formed shouldered rubber bottom having an independent acid and oil proof coating, said body and bottom being united with the said coatings in contact with each other, substantially as specified.

2. The herein-described method of forming hollow rubber receptacles, which consists in first forming the body and bottom separately, coating the interior of the body and the upper face of the bottom with an acid and oil proof material, and then applying heat and pressure to homogeneously unite the body and bottom and bringing said coatings in contact with each other, as set forth.

In testimony that I claim the above I have hereunto subscribed my name in the presence of two witnesses.

EDWARD L. PERRY.

Witnesses:
 CHAS. H. FOWLER,
 L. C. HILLS.